United States Patent [19]

Born

[11] Patent Number: 4,653,629
[45] Date of Patent: Mar. 31, 1987

[54] ARRANGEMENT FOR CONVERTING A WIDE STREAM OF BOTTLES INTO A SINGLE-TRACK STREAM OF BOTTLES

[75] Inventor: Gerhard Born, Bingen, Fed. Rep. of Germany

[73] Assignee: Seitz Enzinger Noll Maschinenbau Aktiengesellschaft, Mannheim, Fed. Rep. of Germany

[21] Appl. No.: 832,813

[22] Filed: Feb. 21, 1986

[30] Foreign Application Priority Data

Mar. 4, 1985 [DE] Fed. Rep. of Germany ....... 3507512

[51] Int. Cl.$^4$ ............................................. B65G 47/68
[52] U.S. Cl. .................................. 198/452; 198/448; 198/457; 198/600
[58] Field of Search ............... 198/433, 448, 452, 453, 198/454, 457, 461, 539, 600

[56] References Cited

U.S. PATENT DOCUMENTS

| | | | |
|---|---|---|---|
| 2,587,959 | 3/1952 | Biner | 198/433 |
| 2,912,093 | 11/1959 | Lauck | 198/457 X |
| 2,921,664 | 1/1960 | Seibert | 198/448 |
| 3,279,580 | 10/1966 | Englander et al. | 198/452 |
| 3,613,863 | 10/1971 | Hedrick et al. | 198/448 X |

Primary Examiner—Jeffrey V. Nase
Attorney, Agent, or Firm—Becker & Becker, Inc.

[57] ABSTRACT

An arrangement for converting a multi-track stream of bottles into a single-track stream of bottles. A conversion region is disposed between a feed mechanism that is provided with guide rails, and a withdrawing mechanism that is likewise provided with guide rails. The conversion region comprises a transfer plate and a conveying region of the withdrawing mechanism, with the conveyer belts of the latter being disposed at an angle to the transfer edge of the transfer plate. This transfer plate forms an essentially level transition between the conveyor belts of the feed mechanism and the conveyor belts of the conveying region of the withdrawing mechanism. Guide rails are also associated with the conversion region. These latter guide rails interconnect the guide rails of the feed mechanism and of the withdrawing mechanism. The track width of the transfer plate corresponds to the track width of the feed mechanism, and is disposed downstream of the latter when viewed in the direction of conveying.

16 Claims, 6 Drawing Figures

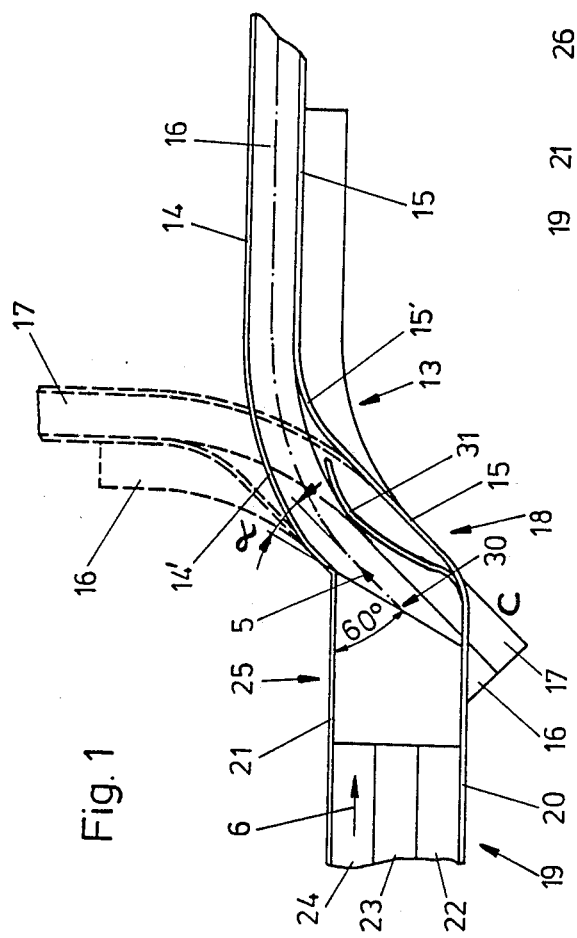
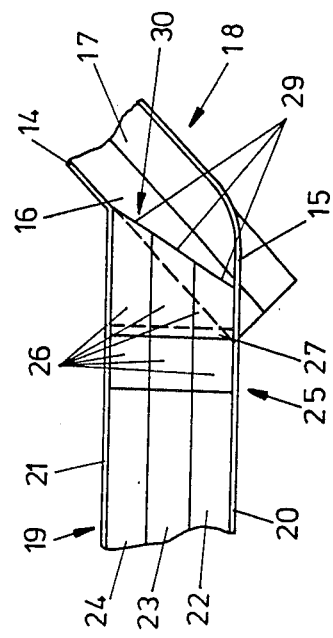

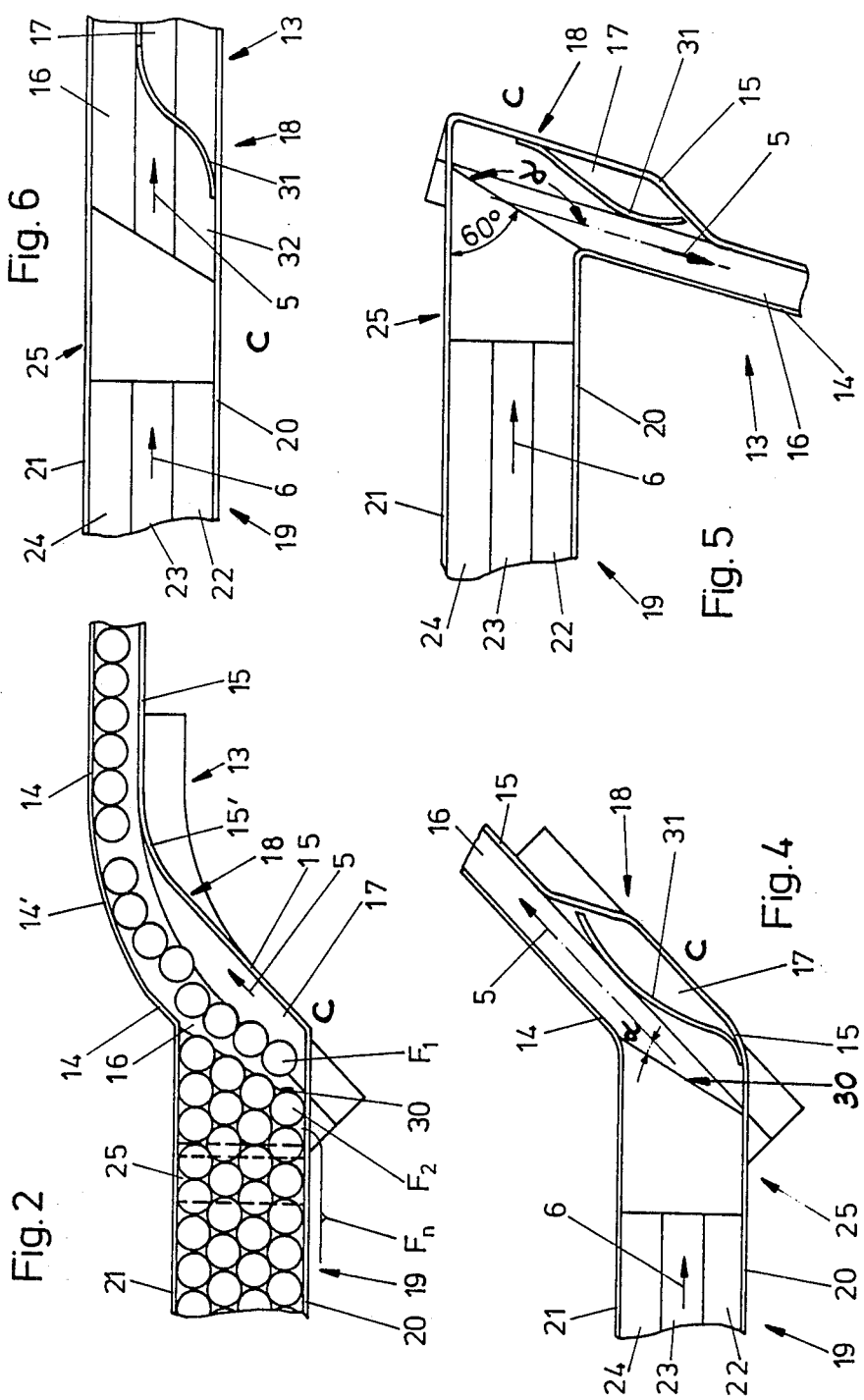

ARRANGEMENT FOR CONVERTING A WIDE STREAM OF BOTTLES INTO A SINGLE-TRACK STREAM OF BOTTLES

BACKGROUND OF THE INVENTION

The present invention relates to an arrangement for converting a wide, delivered stream of bottles into a single-track stream of bottles that is to be withdrawn. A feed mechanism conveys the wide stream of bottles to a conversion region, from where the bottles pass into a withdrawing mechanism that conveys the single-track stream of bottles. The conversion region and the withdrawing mechanism are disposed at essentially the same levels as the feed mechanism. Guide rails are provided at the sides of the feed mechanism, conversion region, and withdrawing mechanism, with those guide rails that are disposed on a given side of the feed mechanism, conversion region, and withdrawing mechanism being connected to one another.

With one heretofore known arrangement of this general type, a so-called wide-track conveyer is disposed at right angles to the conveying direction of the conveyer belts of an intermediate conveyer, the number of conveyer belts of which decrease in the conveying direction to a single conveyer belt, namely the conveyer belt of the withdrawing mechanism. The first and wider track of the intermediate conveyer has a constantly increasing belt speed. This intermediate conveyer effects the conversion of the multi-track stream of bottles to a single-track stream of bottles accompanied by the action of a guide rail that extends from the wide-track conveyer to the withdrawing mechanism, and is transverse to the stream of bottles. See German Offenlegungsschrift No. 31 29 057.

Not only does an arrangement of this type require a lot of space for the relatively long multi-track conversion section that narrows in stages, and expensive and complicated drive mechanisms for realizing the constantly increasing belt speeds for the individual tracks, but it also necessitates large sliding movements for the redistribution of the bottles that takes place during the conversion process. As a result, the bottles have to be transported in a free-standing manner over long stretches. In so doing, bottles fall over, and considerable noise results.

It is an object of the present invention to simplify the conversion of a stream of bottles while to the greatest extent possible eliminating the need for the expensive and space-consuming conversion stretches of the heretofore known arrangement. It is a further object of the present invention to embody the arrangement for accomplishing this in such a way that with the least possible sliding movement of the bottles during the redistribution, it is also possible in the simple manner to realize any angle between the conveying direction of the feed mechanism and the conveying direction of the withdrawing mechanism, in order in this manner to be able to better utilize the existing space conditions than was previously possible.

BRIEF DESCRIPTION OF THE DRAWINGS

These objects, and other objects and advantages of the present invention, will appear more clearly from the following specification in conjunction with the accompanying schematic drawings, in which:

FIG. 1 is a plan view of one inventive arrangement for converting rows of bottles, with the conveying direction of the feed mechanism forming an angle with the conveying direction of the withdrawing mechanism;

FIG. 2 shows the arrangement of FIG. 1, loaded with bottles;

FIG. 3 shows the arrangement of FIG. 1, with a transfer plate that is formed of a plurality of slide plates and has a transfer edge;

FIG. 4 shows an inventive arrangement having a withdrawing mechanism that conveys the single-track stream of bottles in the conveying direction of the conveying region, and also has a deflector disposed in the conveying region;

FIG. 5 shows an inventive arrangement having a conveying region, the conveying direction of which forms an obtuse angle with the conveying direction of the feed mechanism; and FIG. 6 shows an inventive arrangement where the conveying direction in the withdrawing mechanism is parallel to the conveying direction in the feed mechanism and at 60° to the transfer edge.

SUMMARY OF THE INVENTION

The arrangement of the present invention is characterized primarily in that the conversion region embraces a conveying region of the withdrawing mechanism, and a transfer plate that is disposed downstream in the conveying direction of the top run of the conveyer belts of the feed mechanism, with this conveying region of the withdrawing mechanism having a wider conveying surface than does that region of the withdrawing mechanism that conveys the single-track stream of the bottles; the conveying direction of this conveying region of the withdrawing mechanism forms an angle with the transfer edge, of the transfer plate, that is disposed in the conversion region and extends at an angle other than a right angle relative to the direction in which bottles are conveyed in the feed mechanism; the transfer plate has a width corresponding to the track width of the feed mechanism, and is disposed downstream of the latter at essentially the same level; a guide means is associated with the conveying region of the withdrawing mechanism, and narrows the conveying path.

Further specific features of the present invention will be described subsequently.

By the inventive use of a transfer plate that is at the same level as the feed mechanism and the withdrawing mechanism, and that has a transfer edge, in conjunction with a transfer region of the withdrawing mechanism that is disposed at an angle of greater than 12° to this transfer edge, with which conveying region there is associated a guide means, such as guide rails, that narrow the stream of bottles, the conversion of the multi-track stream of bottles into a single-track stream of bottles is operatively extremely reliably achieved in an amazingly simple manner. The long conveyer belts, including the drives therefore, previously required for the conversion region are thereby eliminated.

Since the bottles are fed in rows to the withdrawing mechanism, and are removed at an angle from the region of the transfer edge before the next row of bottles reaches the withdrawing mechanism, a disturbance-free redistribution of the fed bottles is effected in short sections. To the greatest extent possible, this prevents the bottles from falling over. The inventive arrangement also operates at a relatively low noise level, since due to the configuration in the conversion region, little disturbance is produced within the stream of bottles.

DESCRIPTION OF PREFERRED EMBODIMENTS

Referring now to the drawings in detail, FIG. 1 illustrates the conversion region C of one embodiment of the inventive arrangement. To feed the bottles indicated in FIG. 2 to the conversion region C, this arrangement is provided with a feed mechanism 19 that has a plurality, for example three, of parallel conveyer belts 22, 23, 24 that rotate endlessly and at the same speed. Each of these conveyer belts includes a hinged belt coupling, and is driven by a non-illustrated drive mechanism. The upper sides or runs of the conveyer belts 22, 23, and 24 together form a horizontally extending conveyer surface that is delimited on the sides by the guide rails 20, 21.

Also provided is a withdrawing mechanism 13 for conveying the bottles further. The conveying direction 5 of this withdrawing mechanism 13 forms an angle with the conveying direction 6 of the feed mechanism 19. As a variation of the orientation illustrated in FIG. 1, the feed mechanism 19 and the withdrawing mechanism 13 can be disposed in such a way that the conveying directions 5 and 6 form an obtuse angle, as illustrated in FIG. 5. The withdrawing mechanism 13 is provided on the sides with guide rails 14, 15, and is also provided with a conveyer belt 16 and a second conveyer belt 17 that is disposed in that conveying region 18 that is associated with the conversion region C. Both of the conveyer belts 16, 17 provide curved guidance, and are, for example, in the form of hinged belt couplings. However, these conveyer belts can also extend linearly, as illustrated in FIGS. 4 and 5. The conveyer belt 17 ends after the conversion region C, whereas the conveyer belt 16 continues linearly from the conversion region C in the conveying direction of the feed mechanism 19. However, as indicated by dashed lines in FIG. 1, the conveyer belt 16 can also end directly after the conversion region C, and the conveyer belt 17 can continue. Such a configuration is desirable if the single-track stream of bottles is to be withdrawn nearly at right angles to the conveying direction 6 of the feed mechanism 19.

The conveyer belt 16 of the withdrawing mechanism 13 leads to a non-illustrated bottle handling or treatment machine, such as a filling machine or a labeling machine. In the conveying region 18, the upper runs of the conveyer belts 16, 17 are disposed at the same level as the upper runs of the conveyer belts 22 to 24. In this connection, the guide rails 14, 15 form curved sections 14' and 15' in the conveying region 18, with the radii of these curved sections essentially conforming to the radius of curvature of the conveyer belts 16 and 17. However, the curved guide section 15' is different from the curved section 14'. This curved section 15' represents a means for narrowing the conveying path in the conveying region 18. For this function, the section 15' is guided over the upper run of the conveyer belt 16 in order in this way to delimit the conversion region C for the short rows of bottles $F_1$ to $F_n$ that are fed to this region.

In the transition region of the upper runs of the feed mechanism 19 to the common transport surface of the conveyer belts 16, 17 of the conveying region 18 of the withdrawing mechanism 13, there is provided an essentially level transition means in the form of a transfer plate 25. This transfer plate 25 forms a part of the conversion region C, and has a width corresponding to the track width of the feed mechanism 19. In the simplest case, the transfer plate 25 is in one piece, but can also, as shown in FIG. 3, comprise a plurality of slide plates 26, each of which is disposed above a return of the feed mechanism 19 from the upper run to the bottom run, as well as above the associated conveyer belt 16 of the withdrawing mechanism 13. On the transfer side disposed above the conveyer belt 16, the slide plates 26 are provided with a slanted edge 29. In this way, the slanted edges 29 of all of the slide plates 26 form a common transfer edge 30 for the reliable transfer of the bottles, in rows, to the conveyer belts 16, 17. This transfer edge 30 extends transverse to the conveying direction 6 of the conveyer belts 22 to 24 of the feed mechanism 19, and forms an angle of 60° with the direction 6. With this angular orientation, the transfer edge 30 and the conveying direction 5 that exists in the conveying region 18 form an angle $\alpha$ of 12° to 168°, and preferably 15°. The slide plates 26 that are provided with the slanted edges 29 can be rigidly connected to one another via a retaining plate 27 that is attached below (see FIG. 3).

The conveyer belts 16 and 17 of the withdrawing mechanism 13 are driven at the same or at different speeds; however, these conveyer belts 16, 17 are both driven at a speed greater than the speed of the conveyer belts 22 to 24 of the feed mechanism 19. The drive and control devices for accomplishing this are not illustrated.

After appropriately adjusting the speeds of the conveyer belts of the withdrawing mechanism 13 and the feed mechanism 19, a wide stream of bottles is delivered to the feed mechanism 19. The continuously fed bottles are then transferred via the transfer plate 25 onto the conveyer belts 16 and 17 of the curved-guidance withdrawing mechanism 13 in the manner illustrated in FIG. 2. Via the action of the conveyer belt 16, 17, the bottles that are transferred in rows onto the conveyer belts 16 and 17 over the transfer edge 30 are accelerated and withdrawn in the direction of the arrow 5, and, under the additional action of the curved, guiderail section 14', reach the linear portion of the withdrawing mechanism 13. Thus already after a short transport section, a single-track stream of bottles is formed between the guide rails 14 and 15; this single-track stream of bottles is eventually conveyed onto the conveyer belt 16. This conversion process is signficantly enhanced by the inclined orientation of the conveyer belts 16 and 17 of the withdrawing mechanism 13 at the angle $\alpha$, preferably of 15°, to the transfer edge 30.

As can be clearly seen from FIG. 3, as a result of the inventive orientation each row of bottles $F_1$ transferred into the conveying region 18 of the conversion region C is immediately guided further in the direction of transport by the conveyer belts 16 and 17, thus removing this row from the vicinity of the transfer edge 30, so that place is provided for transfer of the next row of bottles $F_2$. Each row of bottles $F_1$ to $F_n$ passes successively to the curved, guide-rail section 14' and thereupon to the guide rail 14, and is subsequently withdrawn, along with previously conveyed rows of bottles, as a single-track stream of bottles in the conveying direction of the feed mechanism 19. In the region of the curved, guide-rail sections 14' and 15', centrifugal forces are effective that accelerate the conversion process.

To rapidly form the single-track stream of bottles in a disturbance-free manner, it can be expedient, as shown in FIG. 1, to dispose a guide means at that guide rail 15 of the withdrawing mechanism 13 located across from the transfer edge 30 and extending on the side of the conveying region 18. This guide means can extend to the conveying path of the conveyer belt 16 and can, for example, be a deflector 31 that is embodied as a plate spring, a permanently elastic rail member, etc. If such a deflector 31 is provided, a respective row of bottles $F_1$ to $F_n$ that passes over the transfer edge 30 into the conveying region 18 is deflected onto the conveyer belt 16 that conveys the single-track stream of bottles out of the conversion region C.

It is also within the scope of the present invention to incline the feed mechanism 19, including the conversion region C, toward the withdrawal side by 1° to 12°, preferably 4° transverse to the conveying direction 5 and about a horizontal axis that extends in the conveying direction 6 of the feed mechanism 19. With this feature, the sloped output becomes effective during the conversion process, so that on the one hand this process is accelerated, and on the other hand the separation of bottles and pieces that have fallen over and are transported by the feed mechanism 19 is enhanced.

It is also within the scope of the present invention to conform the track width of the conveying region 18 of the withdrawing mechanism 13 to the feed mechanism 19 and the transfer plate 25 in such a way that the feed mechanism 19, the transfer plate 25, and the conveying region 18 extend in the same line, as shown in FIG. 6. This is the case if the angle $\alpha$ of the conveyer belt 16 that conveys in the direction 5 of the conveying region 18 is preferably 60°, with the conveying directions of the feed mechanism 19 and the conveying region 18 extending in the same direction. This confirmation of the track width provides for the conveying region 18 a number of conveyer belts 16, 17, 32 that corresponds to the number of conveyer belts 22 to 24 of the feed mechanism 19. In this connection, below the transfer plate 25 the returns of the conveyer belts 22 to 24 from the top run to the bottom run are disposed across from the returns of the conveyer belts 16, 17, 32 from their top runs to their bottom runs. With this embodiment also, it can be expedient to incline the feed mechanism 19, including the conversion region C formed by the transfer plate 25 and the conveying region 18, by 1° to 12°, preferably 4°, transverse to the conveying direction about a horizontal axis that extends in the conveying directions of the feed mechanism 19 and the conveying region 18. In particular, this inclination should be toward the long side that extends along the withdrawing conveyer belt 16 and the feeding conveyer belt 24 in order to accelerate the conversion process and enhance the separation of bottles and pieces that have fallen over and are being transported by the feed mechanism 19.

The present invention is, of course, in no way restricted to the specific disclosure of the specification and drawings, but also encompasses any modifications within the scope of the appended claims.

What I claim is:

1. An arrangement for converting a wide, multi-track stream of bottles into a single-track stream of bottles; a feed mechanism conveys the wide stream of bottles to a conversion region, from where the bottles pass into a withdrawing mechanism that conveys the single-track stream of bottles; said conversion region and said withdrawing mechanism are disposed at essentially the same level as said feed mechanism; guide rails are provided at the sides of said feed mechanism, said conversion region, and said withdrawing mechanism, with those guide rails that are disposed on a given side of said feed mechanism, said conversion region, and said withdrawing mechanism being connected to one another; said arrangement further comprises:

first conveyer belts for said feed mechanism, said first conveyer belts each having a bottom run, and a top run for conveying said bottles;

a transfer plate disposed in said conversion region, and downstream of said first conveyer belts of said feed mechanism, when viewed in the conveying direction of said top runs of said first conveyer belts, for receiving bottles from the latter; said transfer plate has the same track width as does said feed mechanism, and is disposed at essentially the same level as the latter and downstream therefrom; in addition, said transfer plate has a transfer edge, remote from said feed mechanism, that extends at other than a right angle relative to the direction in which said bottles are conveyed in said feed mechanism;

a conveying region, as part of said withdrawing mechanism, for receiving said bottles from said transfer plate, with said conversion region being disposed between, and embracing both, said transfer plate and said conveying region; said withdrawing mechanism also has a second region, adjoining said conveying region, for conveying a single-track stream of bottles, with said conveying region having a wider conveying surface than does said second region of said withdrawing mechanism; said conveying region conveys said bottles in a direction that is disposed at an angle of 12° to 168° to said transfer edge of said transfer plate; and guide means provided in said conveying region of said withdrawing mechanism for narrowing the conveying path of said conveying region downstream of said tranfer plate.

2. An arrangement according to claim 1, in which said angle is 15°.

3. An arrangement according to claim 1, in which said angle is 60°.

4. An arrangement according to claim 1, in which said transfer edge of said transfer plate forms an angle of about 60° with said conveying direction of said top runs of said first conveyer belts of said feed mechanism; and in which said conveying region of said withdrawing mechanism is provided with a second conveyer belt that is adjacent to the downstream returns of the top runs of said first conveyer belts to the bottom runs thereof, with said transfer edge extending over said second conveyer belt to effect said transfer of bottles from said transfer plate to said conveying region.

5. An arrangement according to claim 4, in which said conveying region of said withdrawing mechanism is further provided with at least one third conveyer belt, with said second and third conveyer belts being disposed next to one another, and with one of said second and third conveyer belts continuing beyond said conversion region remote from said transfer plate.

6. An arrangement according to claim 5, in which said second and third conveyer belts of said conveying region of said withdrawing mechanism are endless belts and extend linearly.

7. An arrangement according to claim 5, in which said second and third conveyer belts of said conveying region of said withdrawing mechanism are endless belts that provide curved guidance for said bottles; and in which said conveying region, downstream of said transfer edge of said transfer plate, is embodied as a curved-guide region.

8. An arrangement according to claim 5, in which said transfer plate comprises a plurality of slide plates, with each downstream return of a top run of one of said first conveyer belts to the bottom run thereof having disposed over it a respective one of said slide plates, with the latter also being disposed over said second conveyer belt of said conveying region of said withdrawing mechanism; each of these last-mentioned slide plates has a slanted edge over said second conveyer belt, with all of said slanted edges together forming said transfer edge of said transfer plate.

9. An arrangement according to claim 8, in which those slide plates that are disposed over said second conveyer belt and are provided with said slanted edge are rigidly interconnected from below via a retaining means.

10. An arrangement according to claim 5, in which said guide means that narrows the conveying path of said conveying region is secured downstream of said transfer edge on that guide rail of said withdrawing mechanism that faces the latter.

11. An arrangement according to claim 10, in which said guide means is a section of that guide rail to which it is secured, and extends at an angle to said conveying direction of said top runs of said first conveyer belts of said feed mechanism.

12. An arrangement according to claim 10, in which said guide means is a deflector.

13. An arrangement according to claim 1, in which said feed mechanism and said conversion region are inclined, at the downstream withdrawal side, relative to said conveying direction of said conveying region, and 1°–12° about an axis that extends in said conveying direction of said top runs of said first conveyer belts of said feed mechanism.

14. An arrangement according to claim 13, in which said angle of inclination is about 4°.

15. An arrangement according to claim 1, in which said transfer edge of said transfer plate forms an angle of about 60° with said conveying direction of said top runs of said first conveyer belts of said feed mechanism; and in which said conveying region of said withdrawing mechanism is provided with second conveyer belts that have the same track width as said first conveyer belts and are adjacent to the downstream returns of the top runs of said first conveyer belts to the bottom runs thereof, with said transfer edge extending over said second conveyer belts to effect said transfer of bottles from said transfer plate to said conveying region.

16. An arrangement according to claim 15, in which said transfer plate comprises a plurality of slide plates, with each downstream return of a top run of one of said first conveyer belts to the bottom run thereof having disposed over it a respective one of said slide plates, with the latter also being disposed over said second conveyer belts of said conveying region of said withdrawing mechanism; each of these last-mentioned slide plates has a slanted edge over said second conveyer belts, with all of said slanted edges together forming said transfer edge of said transfer plate.

* * * * *